June 16, 1936. L. E. BARNES Re. 20,003

SORTING MACHINE

Original Filed Nov. 17, 1934 4 Sheets-Sheet 1

INVENTOR
LEON E. BARNES
BY
Howard E. Thompson
ATTORNEY

June 16, 1936. L. E. BARNES Re. 20,003
SORTING MACHINE
Original Filed Nov. 17, 1934 4 Sheets-Sheet 2
Fig. 2
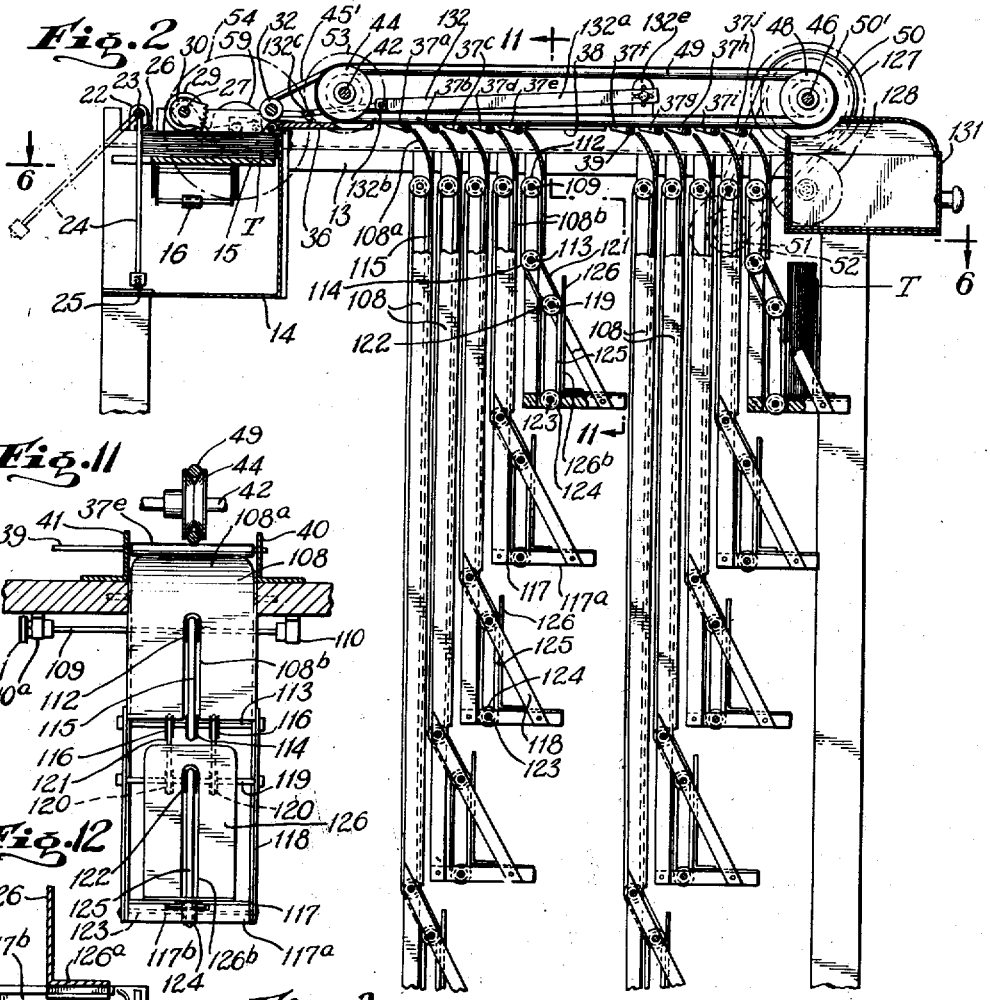
Fig. 11
Fig. 12
Fig. 3
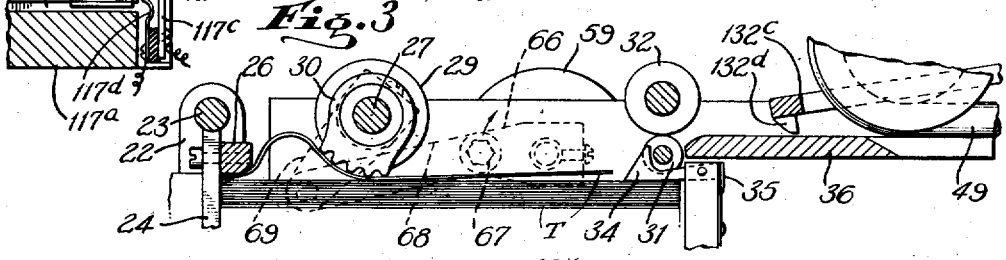
Fig. 4
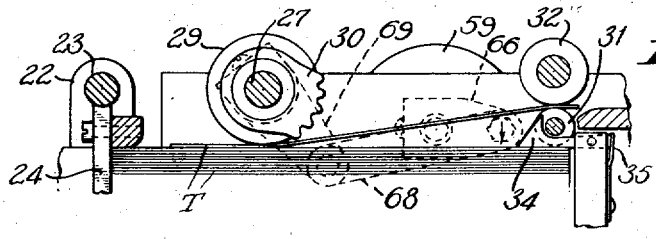
INVENTOR
LEON E. BARNES
BY
ATTORNEY June 16, 1936. L. E. BARNES Re. 20,003

SORTING MACHINE

Original Filed Nov. 17, 1934 4 Sheets-Sheet 3

INVENTOR
LEON E. BARNES
BY
Howard E. Thompson
ATTORNEY

June 16, 1936. L. E. BARNES Re. 20,003
SORTING MACHINE
Original Filed Nov. 17, 1934 4 Sheets-Sheet 4
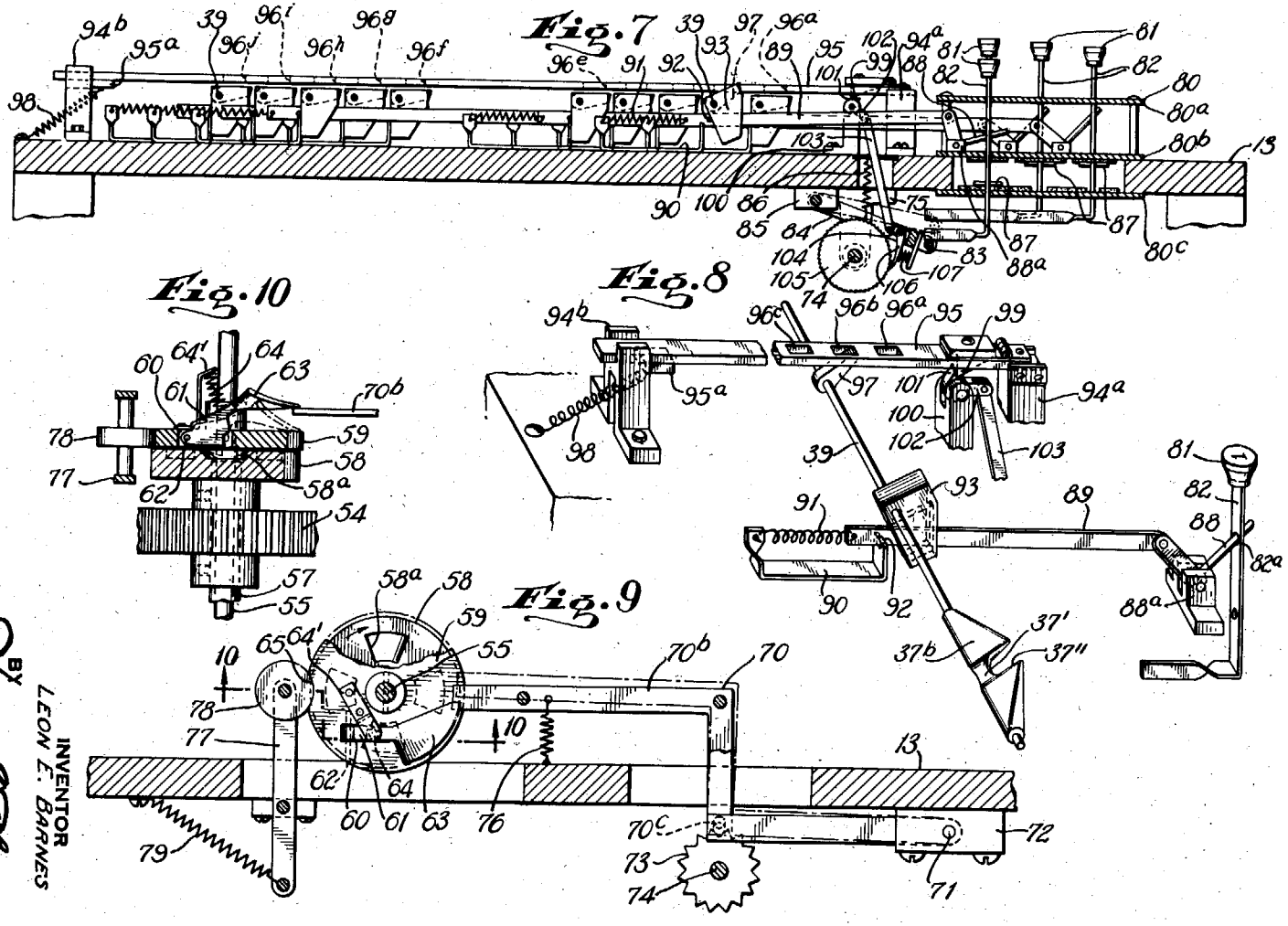
INVENTOR
LEON E. BARNES
BY
ATTORNEY Reissued June 16, 1936

Re. 20,003

UNITED STATES PATENT OFFICE 20,003

SORTING MACHINE

Leon E. Barnes, Westfield, N. J.

Original No. 2,010,130, dated August 6, 1935, Serial No. 753,452, November 17, 1934. Application for reissue May 5, 1936, Serial No. 77,899

45 Claims. (Cl. 214—11)

This invention relates to certain new and useful improvements in mechanical sorting machines, and more particularly to a machine for sorting material of a flexible paper or other stock, such as checks, coupons, sales slips, tickets and other like matter which, for convenience in explanation, is hereinafter referred to as "tickets"; and the principal object of my invention is to provide means by which a quantity of tickets, each bearing a numerical, alphabetical or other identifying designation and arranged with respect to such a designation in a promiscuous or other sequence, may be sorted into consecutive numerical, alphabetical or other sequence, respectively, without the necessity of manually handling the tickets individually and without the necessity of providing on each ticket, solely for sorting purposes, any special indication of its numerical, alphabetical or other designation.

The above objective has been accomplished through the subject of my invention which involves a machine by means of which a quantity of tickets placed in the feeding container thereof can be mechanically picked up one by one, each ticket so picked up being mechanically projected to a conveyor means which conveys the ticket to and through an opened switch entrance leading to a particular ticket receiving receptacle in which said ticket properly belongs, from which point of entrance it is conveyed to and deposited in said receiving receptacle, the operations above referred to, together with the selection and opening of the entrance to the particular receiving receptacle in which each ticket is to be deposited, being controlled entirely and solely by the depression of the corresponding key of a keyboard which is embodied in this machine; a further object being to provide means for conveying and depositing tickets having questionable data thereon or in other words, tickets that should not be sorted, for any reason, in the series being sorted in a cycle of operation of the machine; a further object being to provide means for automatically controlling the operation of the several switch elements through the key operated means employed to render the machine substantially fool-proof in the sorting of tickets by such key operation; a further object being to provide means for controlling the pick-up of individual tickets from a stack or pile and for preventing the passage of more than one ticket into and through the machine, the last mentioned means being adjustable to tickets of different thicknesses; a still further object being to provide means for signalling the operator when any of the respective ticket receiving compartments become filled; and with these and other objects in view, the invention consists in a machine or apparatus of the class and for the purpose specified, which is simple in construction, efficient in use, and which is constructed as hereinafter described and claimed.

The invention is fully disclosed in the following specification, of which the accompanying drawings form a part, in which the separate parts of my improvement are designated by suitable reference characters in each of the views, and in which:

Fig. 2 is a partial section on the line 2—2 of Fig. 1 with certain parts shown in elevation and in section;

Fig. 3 is an enlarged sectional detail view similar to that shown in Fig. 2 of the drawings, indicating the manner of picking up a ticket;

Fig. 4 is a view similar to Fig. 3 omitting part of the construction and indicating the manner of delivering a ticket;

Fig. 7 is a section on the line 7—7 of Fig. 1;

Fig. 8 is a perspective view diagrammatically illustrating the key operating mechanism for actuating the switch elements and for controlling said elements;

Fig. 9 is a partial section on the line 9—9 of Fig. 1 with parts of the construction broken away and in section;

Fig. 10 is a broken section on the line 10—10 of Fig. 9;

Fig. 11 is a partial section on the line 11—11 of Fig. 2; and

Fig. 12 is a sectional detail view of one end portion of one of a number of ticket receiving platforms which I employ.

Figure 1:
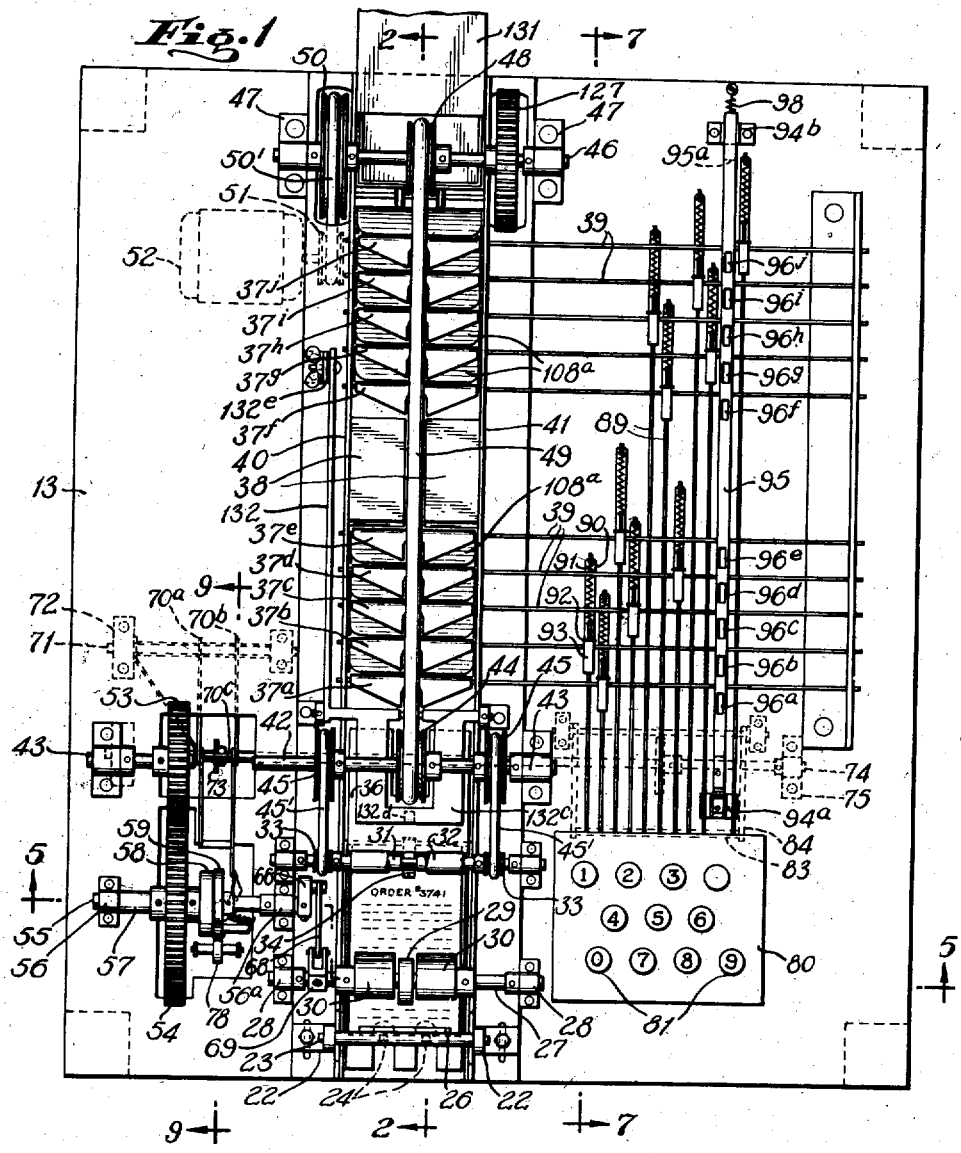
Fig. 1 is a plan view of a machine made according to my invention.

Referring now to the drawings, this invention comprises a table like structure, the top of which serves as the base plate 13 of the machine. Set in the front edge of the base plate 13 is a vertically disposed box-like ticket feeding container 14 open at its front and top sides and provided therein with an elevator platform 15, which is pivotally mounted on one end of a lever arm 16, the other end of said arm being pivotally mounted on the under side of the base plate 13 in standards 17. A pulley 18 is mounted on the lever arm 16 near the elevator platform end. Another pulley 19 is mounted directly above pulley 18 on base plate 13. A supporting and elevating cable 20, one end attached to lever arm 16, extends over pulley 19 and under pulley 18 and is attached at its other end to the revolving drum 21 of an adjustable coiled tension spring device. Thus, it can be seen that the spring of drum 21, when wound to produce a sufficient tension on cable 20, exerts a constantly upward force to elevator platform 15.

Horizontally mounted in standards 22 is a shaft 23, which extends over and across the top of feeding container 14 at the forward end thereof. Suspended from shaft 23 is a gate member 24 which, when in its normal perpendicular position and automatically locked in such position at the bottom of container 14 by means of a friction catch 25 forms a firmly set closure to the front side of container 14. The position of gate member 24 may be adjusted forwardly or backwardly by adjusting the position of standards 22. Such adjustability of gate 24 is provided for to permit proper adjustment of the inside dimension of feeding container 14, from gate 24 to the opposite end of container 14 to accommodate a given length of ticket or different lengths of tickets. In this connection it should be pointed out that the said dimension of container 14 must be only sufficiently greater than the corresponding dimension of the ticket to permit of free elevation of the tickets within container 14. The reason for this requirement is that gate 24 is employed as a stop member to prevent the front edges of the tickets in container 14 from sliding forwardly when the tickets are being picked up in the particular manner employed by this machine and as later described. Gate member 24 is swung open in a forward and upward direction to permit the placing of tickets "T" in container 14 or for the purpose of removing tickets therefrom when necessary. Attached to gate member 24 and protruding therefrom a short distance inwardly into container 14 is an adjustable stop member 26 for controlling the elevation of the topmost ticket in container 14, and for holding a marginal section of said ticket in a substantially flat position to prevent said ticket from slipping down between gate 24 and the other tickets in container 14.

Extending over and across the top of container 14, in a position backward from shaft 23, is a reciprocating shaft 27 horizontally mounted in bearings 28. In a central position laterally on shaft 27 is mounted a narrow rubber surfaced idle roller 29, which can revolve freely on shaft 27. The elevation of shaft 27 is such as to bring the elevation of the lowermost surface of idle roller 29 to the same elevation as that of the topmost ticket in container 14. On each side of idle roller 29 is fixedly mounted on shaft 27, a reciprocating feed cam 30. The protruding cam portion of each roller 30 has a corrugated rubber surface. When the machine is in a normal and inoperative position, the position of each feed cam 30 is such that its corrugated cam surface is directed in a backward and downward direction. In this position, the roller 29 serves its intended purpose of preventing any contact of the topmost ticket in container 14 with the cam surfaces of rollers 30.

Located just inside the top of the rear end of container 14 and extending crosswise thereof is a small metal roller 31. The elevation of roller 31 is such as to bring the elevation of its lowermost surface to approximately the same elevation as that of the topmost ticket in container 14. Mounted directly over roller 31 and parallel thereto is a larger and rubber surfaced roller 32, the elevation of which is such that its lowermost surface is in contact with the topmost surface of roller 31. Mounted on each end of the revolving shaft to which roller 32 is attached is a pulley 33.

Protruding forwardly through a recessed portion of the surface of roller 31 and at a central point thereunder is a switch finger 34 for switching the topmost ticket in container 14 upwardly into the jaws of rollers 31 and 32, as later described. The rear end of switch finger 34 is pivotally mounted at the rear of container 14. Through the tension of a spring 35, the forward end of switch finger 34 is forced constantly downward against the topmost ticket in container 14.

Mounted just backwardly from rollers 31 and 32 is a flat surfaced platform 36, the elevation of the top surface of which is the same as that of the topmost surface of roller 31. Platform 36, which constitutes the forward end of the base of the main runway of the machine, is slotted partly through its center to permit proper elevation and operation of a conveyor belt, later described.

Extending in straight alinement backwardly from platform 36, at the same elevation as that of said platform and constituting a continuation of the base of the main runway, are ten identical switch members 37*a*, 37*b*, 37*c*, 37*d*, 37*e*, 37*f*, 37*g*, 37*h*, 37*i* and 37*j*, each of which is operative in the manner of a lid and when opened affords an entrance to a secondary runway, later described, which leads to a corresponding receiving receptacle later described.

Interposed between switch members 37*e* and 37*f* are two platforms 38, which complete the base of the main runway and which are provided to meet certain spacing requirements of the ticket receiving receptacles later described. It will be observed that said interposing of platforms 38 results in a separate grouping of switch members 37*a* to 37*e* inclusive, and of switch members 37*f* to 37*j* inclusive. The object of such grouping is to effect a similar grouping of the related receiving receptacles 117, later described, for the purpose of sufficiently reducing the altitudinal space required for said receptacles to permit of effectively embodying my invention in a machine of the approximate height of an ordinary low flat top office desk. It can readily be seen from Fig. 2 that if the switch members 37 were not grouped as above described it would be necessary to arrange all of the receiving receptacles 117 in a single group thus doubling the altitudinal space required therefor and thereby making it impossible to effectively embody my invention in a machine of the approximate height of the type of desk above referred to and at the same time provide adequate altitudinal capacity for each of said receptacles. It should be recognized that such multiple grouping of switch members 37 and receptacles 117 makes possible the application of any increased number of said elements without the necessity of any increase in the height of the machine. Each switch member 37*a* to 37*j*, the top plan shape of which is clearly indicated in Figure 1, is flat on its top side except for a recessed portion 37′ extending perpendicularly across the center, and a rounded surface extending over the rear edge and is entirely flat on its bottom side. Each switch member is substantially wedge-shaped in cross sectional form and includes a notch or cut out portion 37''.

It should be noted that, from a top or plan view, each of said switch members 37 is of a triangular formation and that the recessed and cut out portions, 37' and 37'' respectively, when considered in combination, extend from the apex of the triangle to the base of the triangle. The object of the triangular formation of each switch member 37 is explained as follows: Conveyor belt 49, later described, frictionally engages the ticket along its center in a position directly over the recessed portions 37' of switch members 37 and the pressure of said belt upon the ticket over said position has a tendency to raise the sides of the ticket slightly. Also, the sides or any edge portion of a ticket may become raised as a result of crumpling or folding during the course of general handling. Should such a raised portion of the forward edge of a ticket strike the forward edge of a switch member 37 at right angles thereto, as would be the case if the forward edges of said member were straight, i. e., at right angles to the line of travel of conveyor belt 49, the movement of the ticket would be halted. Such difficulty was found to be avoidable by the use of a triangular shaped switch and switch members 37 were, therefore, designed in triangular form especially for such purpose.

The cut out portion 37'' of each switch member 37 provides bifurcations which are adapted to straddle conveyor belt 49 when the switch element 37 is in an opened position. The upper surface of each switch 37 is unobstructed so as to permit of free movement of the tickets thereon and said switch elements are preferably wedge-shaped in cross section to facilitate the deflection of the tickets into the runways 108 later described. The grooved or recessed portions 37' of switch members 37 are necessarily provided to permit of a sufficient amount of pressure or friction of conveyor belt 49 against the ticket to prevent slippage of said belt on the ticket and to avoid any friction between said belt and switch members 37 when a ticket is not in engagement with said belt. Each of the switch members 37*a* to 37*j* includes a rod 39 pivotally mounted in upright bearing and guide strips 40, 41. The rods extend beyond the strip 41 as clearly seen in Fig. 1 of the drawings.

Extending over and across the main runway in a position over platform 36 is a horizontal revolving shaft 42 mounted in bearings 43. Mounted on shaft 42 at a point over the center of the main runway is a pulley 44. Also mounted on shaft 42, at a point over each side of the main runway and in alinement with pulley 33 on the corresponding side of said runway, is a pulley 45. A rubber belt 45' connects each of the two pairs of pulleys 33 and 45.

Extending over and across the rear end of the main runway is another horizontal revolving shaft 46 mounted in bearings 47. Mounted on shaft 46 at a point over the center of the main runway and in alinement with pulley 44 is a pulley 48. A round rubber belt 49 constituting the main conveyor belt connects pulleys 44 and 48, the lower strand of said belt following a horizontal course immediately over and in alinement with the centers of the recessed portions of switch members 37*a* to 37*j*. The lower strand of conveyor belt 49 passes without friction through the slot in platform 36, recesses 37' and notches 37'', said lower strand being preferably disposed slightly below the upper surface of the switch members employed. A pulley 50 mounted on shaft 46 is connected by belt 50' directly with the driving pulley 51 of the operating motor 52.

Fixedly mounted on shaft 42 at the left of the main runway is a gear 53 which operates gear 54 of a clutch assembly next described. This clutch assembly, which is illustrated in detail by Figures 9 and 10, includes a revolving shaft 55 which is mounted in bearings 56 and 56*a*. A revolving sleeve 57 is mounted on the left portion of shaft 55, gear 54 being fixedly mounted on said sleeve. Also fixedly mounted on the sleeve 57 at the right of gear 54 is a round metal disk 58, the right side of which is cut out in a quarterly fashion forming four spoke-like teeth 58*a*, note Fig. 9. Fixedly mounted on shaft 55 at the right of disk 58 and just clear of disk 58 is a round metal disk 59. A rectangular slot 60 is cut through disk 59, and in said slot is pivotally mounted a pawl member 61, hereinafter referred to as the "clutch pawl". Clutch pawl 61 can pivot sufficiently on its pivot rod 62 to allow it to protrude from the left side of disk 59 and become engaged with one of the teeth of disk 58. On the clutch pawl 61 is a cam portion 63 which extends beyond the right side of disk 59 and which is actuated by a switch bar member, later described.

Figure 6:
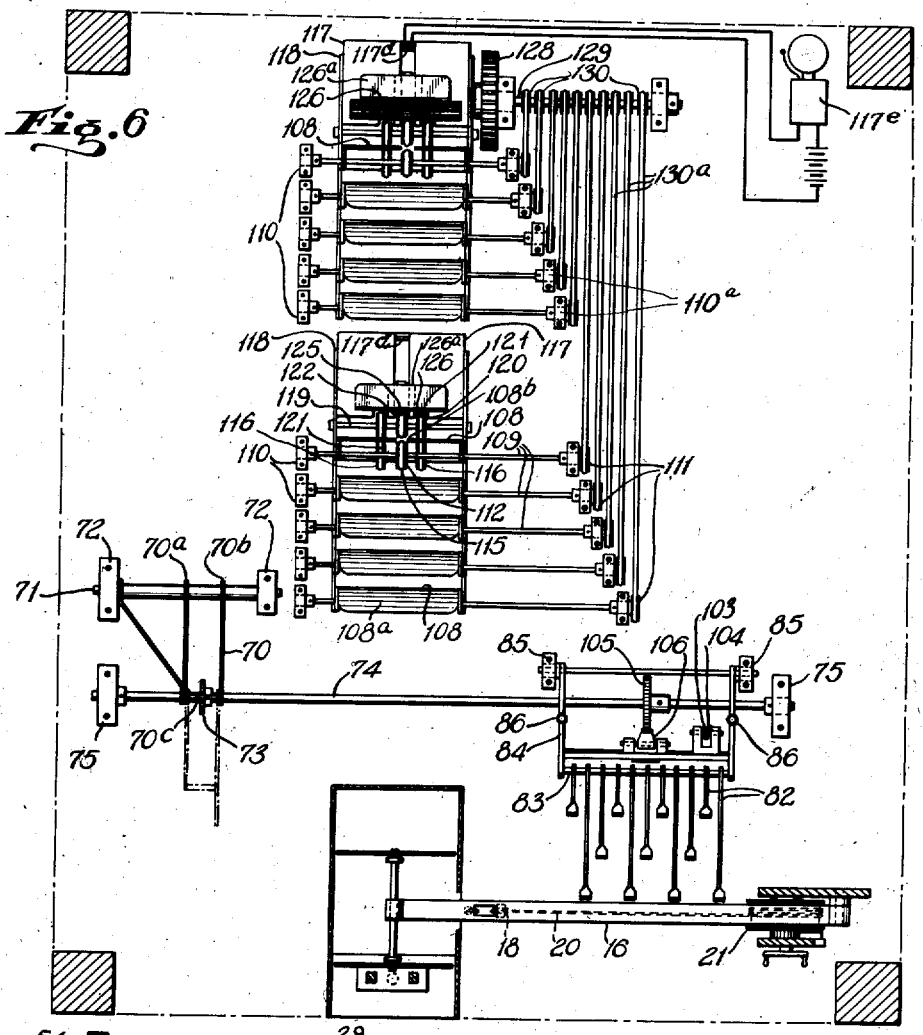
Fig. 6 is a sectional plan view substantially on the line 6—6 of Fig. 2.
Figure 5:
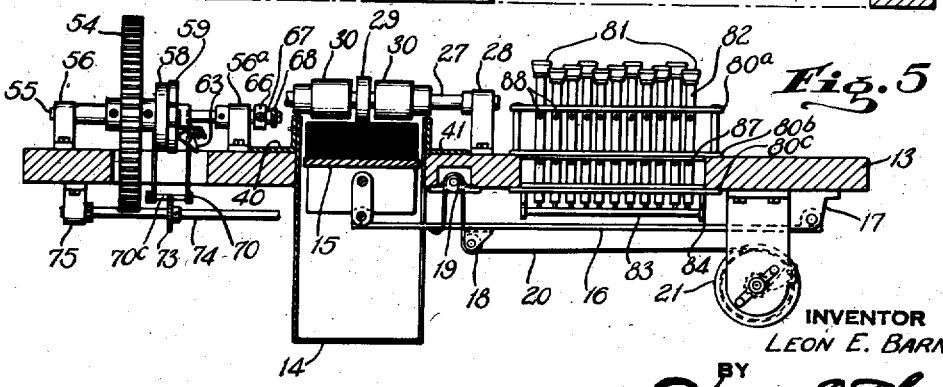
Fig. 5 is a partial section on the line 5—5 of Fig. 1.

A spring 64 mounted between the clutch pawl 61 and a supporting strip 64' serves to normally maintain the clutch pawl 61 in position to engage one of the teeth 58*a* of the disk 58 when the pawl 61 is released. In the outer peripheral surface of the disk 59 is a notch 65, note Fig. 9. Secured to the shaft 55 adjacent the bearing 56*a* is a crank arm 66 at the free end of which is a pin 67 to which is coupled one end of a connecting rod 68, the other end being coupled with the free end of a rocker arm 69, it being understood that the rotation of the crank 66 and its size will govern the oscillatory movement imparted to the shaft 27 through the rocker arm 69. A clutch operating element 70 is employed. This element is pivoted to the lower surface of base plate 13 on a shaft 71 supported in bearings 72. The element 70 consists of spaced angular arms 70*a*, 70*b*, the latter projecting forwardly to a point in close proximity to one side of the disk 59, sufficiently to engage the cam portion 63 of the pawl 61 to control the operation of said pawl. The arms 70*a*, 70*b* are connected by a cross rod 70*c* which operates in connection with a toothed wheel 73 which operates in the form of a cam, the same being secured to a shaft 74 mounted in bearings 75 as clearly seen in Fig. 6 of the drawings.

A spring 76 is connected with the arm 70*b* and to a part attached to the base plate 13, and normally serves to hold the elements 70 in engagement with the toothed wheel or cam 73 as clearly seen in Fig. 9 of the drawings. A lever frame 77 is pivoted to the base plate 13 and has one end extending upwardly through an opening in said base plate. Mounted in the upper end of said frame is a roller 78, designed to engage the notch or recess 65 in the disk 59 to normally retain said disk against rotation and to act as a means for stopping the disk rotation. Connected to the other or lower end of the lever frame is a spring 79 which serves to constantly maintain the roller in engagement with the edge of the disk. In the normal position of the machine the roller 78 is seated in the notch 65 and the arm 70*b* is in engagement with the cam portion 63 to hold the pawl 61 out of engagement with the teeth 58a of the disk 58.

Mounted on base plate 13 at the right of container 14, is a key guide frame 80 consisting of three horizontal disposed slotted plates 80a, 80b and 80c and containing an assembly of eleven key members. Ten of these key members are assigned to the ten numerical characters "0" to "9" inclusive. The eleventh key member is assigned for use in depositing in a special receptacle, later described, any tickets which are illegible or which for any reason it is desired to exclude from the sorting process. Each key member comprises a key top 81 mounted on a key shaft 82 which extends downwardly through perpendicularly alined slots in plates 80a, 80b and 80c, and thence backwardly to a resting position upon a horizontally disposed cross rod 83 at the outer end of a rectangular shaped lever frame 84.

Lever frame 84 is pivotally mounted in bearings 85 attached to the under side of base plate 13. The outer end of lever frame 84 is held upwardly with cross rod 83 bearing against the ends of key shafts 82 by a spring 86 which is affixed to each side of lever frame 84 and attached to base plate 13. Inserted through each key shaft 82 between plates 80b and 80c is a pin 87 which controls the normal and inoperative position of the key member and also the depth of the key stroke. A right angle arm 88 is pivotally mounted at its corner point in a vertically disposed position in a bearing 88a upon the plate 80b, directly backward of each key shaft 82 of each key member which is assigned to one of the numerical characters "0" to "9" inclusive. The forward section of each angle arm 88 consists of a rod extending upwardly and forwardly from plate 80b through a small slot 82a in its associated key shaft 82. The rear section of each angle arm 88 is pivotally mounted to a reach bar 89. Each reach bar 89 extends backwardly under rods 39 to a point just beyond the position of rod 39 of that switch member 37 which is associated with the key member with which the particular reach bar is connected, all as clearly shown in Fig. 8 of the drawings. The rear end of each reach bar 89 is seated in a shallow groove on the forward end of a standard 90 and is attached by a spring 91 to the rear end of said standard. The tension of spring 91 is backwardly, thus its tension upon reach bar, 89 causes the forward section of the angle arm 88 to which the respective reach bar 89 is attached to bear constantly upward against the top edge of the slot 82a in the associated key shaft 82 and to contribute with springs 86 on lever frame 84 in holding the associated key member upwardly in its normal and inoperative position.

From the description thus far given, it can be seen that the depression of any one of the keys assigned to the numerical characters "0" to "9" inclusive, through the downward force exerted by the top edge of the slot 82a in the respective key shaft 82 upon the forward section of the associated angle arm 88, causes said angle arm to pivot forwardly and to thus impart a forward motion to the associated reach bar 89. It can also be seen that upon release of the key, the tension of its associated spring 91 aided by the tension of springs 86 immediately restores the key number and its associated reach bar 89 and angle arm 88 to their normal positions.

Horizontally inserted through each reach bar 89 at right angles thereto and in a position directly over the forward end of the standard 90, on which the respective reach bar rests, is a pin 92.

Fixedly mounted in a suspended manner on each rod 39 in a straddling position over the reach bar 89 with which the respective rod 39 is associated, and resting against both the pin 92 in said reach bar 89 and the forward end of standard 90 on which said reach bar 89 rests, is a member 93 serving three functions, namely, a means for oscillating rod 39 to which member 93 is secured for the purpose of moving the switch member 37a to 37j, selected by the particular key operated, into open position; to actuate dog 97; and further, serves as a weight which effects an immediate closing of the switch member when the switch member is released from its open position by the means next described.

Slidably mounted in channels or grooved seats at the top of standards 94a and 94b is a sliding lock bar 95. This bar is provided with a series of ten slots or openings 96a to 96j inclusive, so positioned that when the machine is in a normal or inoperative position, each opening is located just forwardly of one of the rods 39. Secured to each rod 39 in line with the lock bar 95 is a dog 97, which extends slightly beyond the forward edge of the adjacent slot or opening 96. A shoulder portion 95a on the bar 95 is normally held in engagement with the standard 94b by a spring 98 to maintain the normal and inoperative position of lock bar 95. To the forward end of the bar is hinged or pivoted a toothed member 99 which extends downwardly through a slot in said bar to project through the lower surface thereof. Arranged in a standard 100 is a pawl 101 having an arm 102 with which is connected a link rod 103, the latter being pivoted to the frame 84 as indicated at 104, note Figs. 6, 7 and 8.

A fine toothed ratchet wheel 105 is secured to the shaft 74 within the frame 84, and pivotally mounted centrally of the frame 84 is a pawl 106 normally held in engagement with the wheel 105 by a spring 107, note Fig. 7. It will thus be apparent that in the downward movement of the lever frame by the action of any one of the keys, the wheel 105 will be partially rotated to correspondingly rotate the shaft 74, sufficient only to force the cross rod 70c over one tooth of the wheel 73.

Extending downwardly from the base plate 13 are a series of U-shaped runways 108, one for each of the switch members 37a to 37j respectively, the runways being of graduated lengths to provide for the location of ticket receiving receptacles disposed at the lower ends thereof as may be seen from a consideration of Fig. 2 of the drawings. Said graduation in the lengths of runways 108 permits the assembly of the receiving receptacles 117 constituting each grouping thereof, one over the other in the staggered or offset manner shown in Fig. 2. Such manner of assembly was applied to reduce the length of the main runway of the machine to a practical minimum and also to produce greater compactness of the machine. The upper end of each runway has a forwardly curved extension 108a projecting through the base plate 13, and the free end of which is disposed adjacent the respective switch member so as to direct the tickets passed through the switch member into the respective runway. The base or cross plate of each runway is provided with a slot 108b arranged longitudinally thereof. Slot 108b in each runway 108 is provided for a similar purpose as that for which the recessed portion 37' of each switch member 37 is provided, namely, to permit of a sufficient amount of pressure or friction of conveyor belt 115 against the ticket to prevent slippage of said belt on the ticket and to avoid any friction between said belt and the base or cross plate of runway 108 when a ticket is not in engagement with said belt.

At the upper end of each runway is a transverse shaft 109 mounted in bearings 110 and 110a, the latter bearing being disposed to the right side of the runway, the shaft 109 extending through said bearings and having a pulley 111 on its projecting end. It will be noted on a consideration of Fig. 6 of the drawings that the lengths of the shaft 109 vary so as to provide the staggered or spaced relation of the pulleys 111 for alinement with the driving pulleys, later described. Secured to the shafts 109 centrally of the runways and in alinement with the slots 108b therein are pulleys 112. Mounted at the lower end portions of runways 108 are shafts 113, on which are secured centrally, pulleys 114 and rubber belts 115 are passed around the pulleys 112 and 114 and constitute conveyor belts for conveying the tickets delivered into the runways to the lower end portions of the runways. A pair of pulleys 116 are secured to the shaft 113, one pulley at each side of the pulley 114.

At the lower end of each runway is a ticket receiving receptacle 117 having a backwardly directed base plate 117a, the rear end portion of which joins the runway in angularly disposed side brace bars 118, in which is mounted a shaft 119. Secured to each shaft are two pulleys 120 arranged in alinement with the pulleys 116. Belts 121 pass around the pulleys 116, 120, and provide additional means for conveying the ticket delivered from the conveyor belt 115 into the ticket receiving receptacle. Secured centrally to the shaft 119 is a pulley 122, and fixed to a shaft 123 arranged in the base plate 117a is another pulley 124 and a belt 125 passes around the pulleys 122 and 124 to provide a means for delivering and stacking the tickets in a vertical position within the receptacle.

Belt 125 is offset from belt 115, as clearly shown in Fig. 2, such offset being required to prevent the ticket, or tickets, last deposited in a receiving receptacle 117 from obstructing the entry of the next ticket to be deposited in the same receptacle.

Slidably mounted in the base plate or platform 117a of the receptacle is a ticket backing or supporting plate 126. The lower portion or base 126a of the plate is keyed to and slidable in a channel 117b formed in the platform 117a, note Fig. 12. The plate 126 is also preferably provided with a vertical slot 126b in alinement with the belt 125 to facilitate the depositing of the first ticket delivered to the receptacle, said slot permitting of a sufficient amount of pressure or friction of conveyor belt 125 against said ticket to prevent slippage of said belt on said ticket and also avoiding any friction between said belt and supporting plate 126 when there is no ticket in said receptacle. The height of the shafts 119 with respect to the height of the tickets is such as to provide admission of the successive tickets, as will be apparent. In this connection, note the upper right hand corner of Fig. 2 of the drawings. A fixed electric contact 117c and a spring contact 117d are disposed at the rear ends of the respective receptacles 117, the backing plate 126 or the base 126a thereof being adapted to force the spring contact 117d into engagement with the contact 117c when the receptacle becomes filled to complete the electric circuit to an audible signal, for example, a bell, diagrammatically illustrated at 117e in Fig. 6 of the drawings. It will be apparent that other types of signals may be employed to indicate to the operator when the respective ticket receiving receptacles are filled.

Secured to the shaft 46 is a gear 127 which meshes with a gear 128 secured to a shaft 129 mounted in suitable bearings on the under surface of the base plate 13. Secured to the shaft 129 at spaced intervals longitudinally thereof are pulleys 130, each of which is in alinement with one of the pulleys 111 of the shafts 109, as clearly seen in Fig. 6 of the drawings, and belts 130a pass around the pulleys 111, 130, to provide a driving means for the respective shafts 109.

A special receptacle 131 for receiving tickets which are illegible or which for any reason it is desired to exclude from the assorting process, is mounted at the rear end of the main runway of the machine, said receptacle consisting merely of a box-like drawer into which a ticket is deposited by a conveyor belt 49, when all switch members 37a to 37j are closed.

For the purpose of preventing two or more tickets from passing through the machine together an adjustable detector device 132 is employed. This device consists of a long lever arm 132a, the forward end portion of which is pivoted on a transverse shaft 132b disposed adjacent the pulley 44, the lever having a forwardly extending U-shaped portion 132c disposed between the shaft 42 and the platform 36 as will appear from a consideration of Figs. 1 and 2.

Centrally of the crosshead of the part 132c is a downwardly projecting detector finger 132d, note Fig. 3 of the drawings. The forward surface of this finger is beveled to insure the delivery of the ticket therebeneath. The rear end portion of the lever arm 132a of the detector device is vertically adjustable in a bracket 132e, note Fig. 2, so as to permit raising and lowering of detector finger 132d with respect to the platform 36 to gage the clearance space for a single ticket, permitting the free passage of one ticket between the said finger and platform, but preventing the passage of more than one ticket therethrough. In the event that two tickets should be caught or otherwise attached together and delivered from roller 32, the same will be stopped at the detector finger 132d and will be buckled up forwardly of said finger and further become ejected by the force of roller 32.

The operation of the clutch mechanism will be understood from the foregoing description when taken in connection with the following statement. The driving motor 52 is in operation when the machine is in condition for use. However, until a key 81 is depressed, the clutch is idle, with the exception that the gear 54 and disk 58 are rotating. Upon depressing one of the keys, for example, the key with the numeral "1" thereon, the reach bar 89 controlled by the key number "1" is moved forwardly against the tension of the spring 91 by the operation of angle arm 88. In this operation, the pin 92 in said reach bar actuates the member 93, rocking the shaft 39 to raise the switch 37b in the manner indicated in Figs. 2 and 8 of the drawings.

In this operation, the cross rod 83 is depressed to move the frame 84 downwardly, which in turn feeds the lock bar 95 forwardly by engagement of the pawl 101 with the tooth member 99 permitting the dog 97 to pass upwardly into slot 96b and become engaged by bar 95, thus holding switch 37b in raised position, it being understood that before the key has reached the limit of its downward movement, the pawl 101 will have been released from the tooth member 99, releasing the bar 95 which returns to its normal position, as is indicated diagrammatically in Fig. 8 of the drawings. In this same operation, the downward movement of the frame 84 causes the pawl 106 to rotate the ratchet 105 sufficiently to cause the toothed wheel 73 to rotate one tooth, in which operation, the element 70 or the arm 70b thereof is raised, as indicated in dotted lines in Fig. 9, thus releasing the cam portion 63, permitting the same to move inwardly into the dotted line position indicated in Fig. 10, so that the pawl 61 will move into position to engage the next spoke 58a of the revolving disk 58, causing said disk to rotate the clutch disk 59 one complete revolution. The pawl 61 is moved out of engagement with the disk 58 prior to the completion of said revolution by engagement of the cam portion 63 with the arm 70b. The latter, in engaging said cam portion, operates to move the same from the dotted line position into the full line position as shown in Fig. 10. The momentum of the clutch disk 59 is stopped by the roller 78 dropping into the recess 65.

In the aforesaid rotation of the clutch disk 59, the ticket pick up and delivery cams 30 are actuated to deliver one ticket to the feeding and conveying means as later described. In the aforesaid operation, the forward movement of the bar 95 operates to return any previously raised switch member to a closed position, leaving only the one switch member controlled by the key which is depressed in the raised position. The foregoing completes the description of the mechanism embodied in this machine and I will now explain the operation of the machine as applied to numerical assorting.

After adjusting the position of gate member 24 to produce an inner lengthwise dimension of container 14, slightly greater than the length of the tickets to be assorted, said gate member is opened to a raised position. Lever arm 16 is depressed, thus lowering elevator platform 15 in container 14. A stack of unassorted tickets, numbered side up, is placed upon platform 15 in container 14, and while lever arm 16 is still depressed, gate member 24 is lowered into its normal perpendicular and locked position in container 14. The lowering of gate member 24 while lever arm 16 is still depressed and, therefore, while the topmost ticket is free from pressure against any member above it, enables gate member 24 to force any protruding tickets into proper perpendicular alinement with the other tickets. Lever arm 16 is then released, forcing elevator platform 15 upwardly until stopped by the pressure of the topmost ticket against stop member 26, idle roller 29 and switch finger 34. All ticket supporting plates 126 in receptacles 117 are then set in their foremost positions.

The motor is started, thereby setting all pulleys and gears into revolving motion which is uninterruptedly maintained while the motor is in operation. As viewed from the right side of the machine, roller 32 and conveyor belt 49 are traveling in a counter clockwise direction, while conveyor belts 115, 121, and 125 are traveling in a clockwise direction.

Assuming that the number on the topmost ticket is 3741, the operator depresses the key bearing the numerical designation 1, note Figs. 1, 7 and 8. The single downward stroke of this key, firstly, operates lock bar 95, thereby closing any switch member 37a to 37j that may then be open; secondly, opens switch member 37b, which through the action of lock bar 95, becomes locked in its open position by dog 97 and thirdly, releases cam portion 63, thereby actuating the clutch mechanism and producing approximately a ninety-degree turn and return forwardly and backwardly respectively, of the feed cams 30 as shown in Figs. 3 and 4 of the drawings.

Immediately following the start of the turn of the feed cams, the corrugated friction surfaces thereof come into contact with the surface of the ticket, and by force of friction, grip the ticket and force it to slide forwardly with feed cams 30, for the remaining distance of their turn, such action, in combination with that of gate 24 in preventing the front edge of the ticket from sliding forwardly, causing the ticket to buckle upwardly between the positions of cams 30 and stop member 26 and to be drawn out from under switch finger 34, note Fig. 3.

With the return movement of cams 30 to their normal and inoperative positions, the friction of said cams upon the ticket, aided by the release of the spring force which has been set up in the ticket through the said buckling thereof, forces the ticket to move backwardly with cams 30, during the course of which movement, the ticket is deflected upwardly by switch finger 34 into the jaws of rollers 31 and 32. Concurrently with the engagement of the ticket by rollers 31 and 32, cams 30 reach their normal and inoperative positions, thus releasing their contact with the ticket. The action of rollers 31 and 32 projects the ticket under finger 132d, then between conveyor belt 49 and runway platform 36, where by the force of friction, the ticket is gripped by conveyor belt 49 and by the same force, conveyed by said belt over the top surfaces of runway platform 36 and switch member 37a, whereupon it strikes the slanting under side of the opened switch member 37b and is deflected downwardly into the runway 108, admission to which is controlled by the switch 37b where it becomes engaged between the runway base and the conveyor belt 115 of said runway. By the force of friction, said belt 115 conveys the ticket downwardly through the runway, from which it is deflected backwardly through the guidance of belts 121, associated with said runway, into engagement between ticket supporting plate 126 and conveyor belt 125 of the receiving receptacle 117 forming part of said runway unit. By the force of friction, said belt 125 conveys the ticket downwardly to an upright resting position on the base platform 117a of said receiving receptacle 117, with the numbered side of the ticket facing backwardly. Each succeeding ticket which is deposited in this same receptacle will become engaged between said conveyor belt 125 and the ticket last deposited in that receptacle, and come to rest, as already described, forwardly of said last ticket.

Each ticket in container 14 is picked up, conveyed to and deposited in its respective receiving receptacle 117, in a similar manner as that described above by depressing the key bearing the numerical designation corresponding to the units digit of the number appearing on the respective ticket.

When the stack of tickets originally placed in the container 14 and disposed of as above described does not constitute the entire group of tickets to be assorted, another stack of the unassorted portion of said group is placed in container 14 and likewise assorted according to the units digits of the numbers appearing on the respective tickets. This process is repeated as necessary, until all of the tickets in the entire group to be assorted have ben thusly disposed of, when the tickets are then removed from the respective receptacles 117 and stacked, numbered side up, in numerical order in respect to the units digits. The entire reassembled group of tickets is again processed through the machine, the same procedure as that described above being repeated with respect to the next digit of the numbers, for example, the ten digit of the numbers, and this complete operation is repeated until an assortment of all of the tickets has been made with respect to all of the digits controlling the numbers thereon. Upon the completion of this assortment, the stacking of the tickets will arrange them in numerical sequence.

While this machine is equally adaptable to any numerical sorting process involving the reading of digits from left to right, such as the process commonly applied under the conventional manual method of sorting, it has been made especially adaptable to the process of sorting involving the reading of digits from right to left, as above described, for the purpose of greatly reducing the number of preliminary individual assortments and the amount of manual material handling required under the conventional manual method of sorting. Under such manual method, and assuming for example, a ticket sorting job involving a numbering range of from 1 to 10,000, the tickets are usually sorted first into thousands, then each thousand into hundreds, then each hundred into tens, and finally each ten into units. Such a process actually involves the creation and assembly of 11,110 different preliminary assortments, whereas, through the process of sorting by digits as read from right to left, to which process this machine is especially adaptable, the number of preliminary individual assortments to be created and assembled would be reduced to 40. However, in order to apply the latter process it is necessary that the correct numerical sequence for each class of digits involved, when once established, must thereafter be maintained. This requirement has been met in this machine by providing simple and effective means for depositing the tickets in each receiving receptacle 117 in a vertical position with the numbered side of each succeeding ticket facing the unnumbered side of the preceding ticket.

It will be understood that machines may be employed with different types and numbers of operating keys to adapt the machine to different uses, for example, twenty-six or more keys may be employed for alphabetical assortment, and in the latter event, a corresponding number of switch elements may be employed as well as the parts cooperating with both, it being further understood in this connection that my invention is not necessarily limited to the specific structural details herein shown and described, nor to the manner of actuating the separate mechanisms or devices.

It will be apparent that my invention is not necessarily limited to a machine for sorting tickets or similar members as the same may be used as a means for distributing or delivering tickets and the like.

Having fully described my invention, what I claim as new and desire to secure by Letters Patent, is:

1. A ticket handling machine comprising a ticket supporting surface extending longitudinally of the machine, means at the forward end of said surface for movably supporting a stack of tickets, means arranged above said first named means for picking up and delivering the uppermost ticket of the stack to said surface, a plurality of receptacles spaced longitudinally of and arranged below said surface and into which the tickets are to be delivered, a plurality of switch elements forming part of said supporting surface and of a width equal to the width of said surface, said elements controlling transmission of tickets to the respective receptacles, and means arranged longitudinally of the machine and said supporting surface above said switch elements for conveying tickets from the pick up and delivery means to the respective switch elements for transmission to the receptacles controlled thereby.

2. A ticket handling machine comprising a ticket supporting surface extending longitudinally of the machine, means at the forward end of said surface for movably supporting a stack of tickets, means arranged above said first named means for picking up and delivering the uppermost ticket of the stack to said surface, a plurality of receptacles spaced longitudinally of and arranged below said surface and into which the tickets are to be delivered, a plurality of switch elements forming part of said supporting surface and of a width equal to the width of said surface, said elements controlling transmission of tickets to the respective receptacles, means arranged longitudinally of the machine and said supporting surface above said switch elements for conveying tickets from the pick up and delivery means to the respective switch elements for transmission to the receptacles controlled thereby, each receptacle having independently driven conveyor means for feeding the tickets to the storage end of the receptacle, and means adjacent each switch element for guiding the ticket delivered by said element into the conveyor means controlled by said element.

3. A ticket handling machine comprising a ticket supporting surface extending longitudinally of the machine, means at the forward end of said surface for movably supporting a stack of tickets, means arranged above said first named means for picking up and delivering the uppermost ticket of the stack to said surface, a plurality of receptacles spaced longitudinally of and arranged below said surface and into which the tickets are to be delivered, a plurality of switch elements forming part of said supporting surface and of a width equal to the width of said surface, said elements controlling transmission of tickets to the respective receptacles, means arranged longitudinally of the machine and said supporting surface above said switch elements for conveying tickets from the pick up and delivery means to the respective switch elements for transmission to the receptacle controlled thereby, and means including a long tensioned arm for constantly supporting the tickets in engagement with the pick up and delivery means.

4. A ticket handling machine comprising a ticket supporting surface extending longitudinally of the machine, means at the forward end of said surface for movably supporting a stack of tickets, means arranged above said first named means for picking up and delivering the uppermost ticket of the stack to said surface, a plurality of receptacles spaced longitudinally of and arranged below said surface and into which the tickets are to be delivered, a plurality of switch elements forming part of said supporting surface and of a width equal to the width of said surface, said elements controlling transmission of tickets to the respective receptacles, means arranged longitudinally of the machine and said supporting surface above said switch elements for conveying tickets from the pick up and delivery means to the respective switch elements for transmission to the receptacles controlled thereby, means including a long tensioned arm for constantly supporting the tickets in engagement with the pick up and delivery means, and an adjustable gage device interposed between the pick up and delivery means, and said first named conveyor means controlling the feed of a single ticket into said conveyor means.

5. A ticket handling machine comprising a ticket supporting surface extending longitudinally of the machine, means at the forward end of said surface for movably supporting a stack of tickets, means arranged above said first named means for picking up and delivering the uppermost ticket of the stack to said surface, a plurality of receptacles spaced longitudinally of and arranged below said surface and into which the tickets are to be delivered, a plurality of switch elements forming part of said supporting surface and of a width equal to the width of said surface, said elements controlling transmission of tickets to the respective receptacles, means arranged longitudinally of the machine and said supporting surface above said switch elements for conveying tickets from the pick up and delivery means to the respective switch elements for transmission to the receptacles controlled thereby, a series of manually actuated keys arranged at one side of the machine adjacent the pick up and delivery means, and means including rods extending from each switch element to the first named side of the machine and in operative engagement with predetermined keys whereby the depression of one of the keys will cause one of said switch elements to be moved into operative position.

6. A ticket handling machine comprising a ticket supporting surface extending longitudinally of the machine, means at the forward end of said surface for movably supporting a stack of tickets, means arranged above said first named means for picking up and delivering the uppermost ticket of the stack to said surface, a plurality of receptacles spaced longitudinally of and arranged below said surface and into which the tickets are to be delivered, a plurality of switch elements forming part of said supporting surface and of a width equal to the width of said surface, said elements controlling transmission of tickets to the respective receptacles, means arranged longitudinally of the machine and said supporting surface above said switch elements for conveying tickets from the pick up and delivery means to the respective switch elements for transmission to the receptacles controlled thereby, a series of manually actuated keys arranged at one side of the machine adjacent the pick up and delivery means, means including rods extending from each switch element to the first named side of the machine and in operative engagement with predetermined keys whereby the depression of one of the keys will cause one of said switch elements to be moved into operative position, and a control bar arranged longitudinally of the machine and in operative engagement with all of said rods for supporting the respective switch elements in raised position when the respective keys are released.

7. A ticket handling machine comprising a ticket supporting surface extending longitudinally of the machine, means at the forward end of said surface for movably supporting a stack of tickets, means arranged above said first named means for picking up and delivering the uppermost ticket of the stack to said surface, a plurality of receptacles spaced longitudinally of and arranged below said surface and into which the tickets are to be delivered, a plurality of switch elements forming part of said supporting surface and of a width equal to the width of said surface, said elements controlling transmission of tickets to the respective receptacles, means arranged longitudinally of the machine and said supporting surface above said switch elements for conveying tickets from the pick up and delivery means to the respective switch elements for transmission to the receptacles controlled thereby, a series of manually actuated keys arranged at one side of the machine adjacent the pick up and delivery means, means including rods extending from each switch element to the first named side of the machine and in operative engagement with predetermined keys whereby the depression of one of the keys will cause one of said switch elements to be moved into operative position, a control bar arranged longitudinally of the machine and in operative engagement with all of said rods for supporting the respective switch elements in raised position when the respective keys are released, said control bar being in operative engagement with the respective keys to return a raised switch element to normal position in the operation of raising another switch element.

8. A ticket handling machine comprising a ticket supporting surface extending longitudinally of the machine, means at the forward end of said surface for movably supporting a stack of tickets, means arranged above said first named means for picking up and delivering the uppermost ticket of the stack to said surface, a plurality of receptacles spaced longitudinally of and arranged below said surface and into which the tickets are to be delivered, a plurality of switch elements forming part of said supporting surface and of a width equal to the width of said surface, said elements controlling transmission of tickets to the respective receptacles, means arranged longitudinally of the machine and said supporting surface above said switch elements for conveying tickets from the pick up and delivery means to the respective switch elements for transmission to the receptacles controlled thereby, a series of manually actuated keys arranged at one side of the machine adjacent the pick up and delivery means, means including rods extending from each switch element to the first named side of the machine and in operative engagement with predetermined keys whereby the depression of one of the keys will cause one of said switch elements to be moved into operative position, a control bar arranged longitudinally of the machine and in operative engagement with all of said rods for supporting the respective switch elements in raised position when the respective keys are released, said control bar being in operative engagement with the respective keys to return a raised switch element to normal position in the operation of raising another switch element, and means comprising a clutch mechanism for actuating the ticket pick up and delivery means in the operation of each of said keys.

9. A ticket handling machine comprising a ticket supporting surface extending longitudinally of the machine, means at the forward end of said surface for movably supporting a stack of tickets, means arranged above said first named means for picking up and delivering the uppermost ticket of the stack to said surface, a plurality of receptacles spaced longitudinally of and arranged below said surface and into which the tickets are to be delivered, a plurality of switch elements forming part of said supporting surface and of a width equal to the width of said surface, said elements controlling transmission of tickets to the respective receptacles, means arranged longitudinally of the machine and said supporting surface above said switch elements for conveying tickets from the pick up and delivery means to the respective switch elements for transmission to the receptacles controlled thereby, a series of manually actuated keys arranged at one side of the machine adjacent the pick up and delivery means, means including rods extending from each switch element to the first named side of the machine and in operative engagement with predetermined keys whereby the depression of one of the keys will cause one of said switch elements to be moved into operative position, a control bar arranged longitudinally of the machine and in operative engagement with all of said rods for supporting the respective switch elements in raised position when the respective keys are released, said control bar being in operative engagement with the respective keys to return a raised switch element to normal position in the operation of raising another switch element, means comprising a clutch mechanism for actuating the ticket pick up and delivery means in the operation of each of said keys, a receptacle at the rear end of said supporting surface, and a key on said key board actuating said clutch and control bar to permit the delivery of tickets into said last named receptacle.

10. A ticket handling machine comprising a ticket supporting surface extending longitudinally of the machine, means at the forward end of said surface for movably supporting a stack of tickets, means arranged above said first named means for picking up and delivering the uppermost ticket of the stack to said surface, a plurality of receptacles spaced longitudinally of and arranged below said surface and into which the tickets are to be delivered, a plurality of switch elements forming part of said supporting surface and of a width equal to the width of said surface, said elements controlling transmission of tickets to the respective receptacles, means arranged longitudinally of the machine and said supporting surface above said switch elements for conveying tickets from the pick up and delivery means to the respective switch elements for transmission to the receptacles controlled thereby, a series of manually actuated keys arranged at one side of the machine adjacent the pick up and delivery means, means including rods extending from each switch element to the first named side of the machine and in operative engagement with predetermined keys whereby the depression of one of the keys will cause one of said switch elements to be moved into operative position, a control bar arranged longitudinally of the machine and in operative engagement with all of said rods for supporting the respective switch elements in raised position when the respective keys are released, said control bar being in operative engagement with the respective keys to return a raised switch element to normal position in the operation of raising another switch element, means comprising a clutch mechanism for actuating the ticket pick-up and delivery means in the operation of each of said keys, a plurality of independently driven conveyor units for transmitting tickets from the switch elements to their respective receptacles, and means for guiding the tickets from the switch elements in the conveyor units.

11. A ticket handling machine comprising a ticket supporting surface extending longitudinally of the machine, means at the forward end of said surface for movably supporting a stack of tickets, means arranged above said first named means for picking up and delivering the uppermost ticket of the stack to said surface, a plurality of receptacles spaced longitudinally of and arranged below said surface and into which the tickets are to be delivered, a plurality of switch elements forming part of said supporting surface and of a width equal to the width of said surface, said elements controlling transmission of tickets to the respective receptacles, means arranged longitudinally of the machine and said supporting surface above said switch elements for conveying tickets from the pick up and delivery means to the respective switch elements for transmission to the receptacles controlled thereby, a series of manually actuated keys arranged at one side of the machine adjacent the pick up and delivery means, means including rods extending from each switch element to the first named side of the machine and in operative engagement with predetermined keys whereby the depression of one of the keys will cause one of said switch elements to be moved into operative position, a control bar arranged longitudinally of the machine and in operative engagement with all of said rods for supporting the respective switch elements in raised position when the respective keys are released, said control bar being in operative engagement with the respective keys to return a raised switch element to normal position in the operation of raising another switch element, means comprising a clutch mechanism for actuating the ticket pick-up and delivery means in the operation of each of said keys, a plurality of independently driven conveyor units for transmitting tickets from the switch elements to their respective receptacles, means for guiding the tickets from the switch elements to the conveyor units, and means including a movable backing wall for stacking the tickets in each receptacle.

12. A ticket handling machine comprising a ticket supporting surface extending longitudinally of the machine, means at the forward end of said surface for movably supporting a stack of tickets, means arranged above said first named means for picking up and delivering the uppermost ticket of the stack to said surface, a plurality of receptacles spaced longitudinally of and arranged below said surface and into which the tickets are to be delivered, a plurality of switch elements forming part of said supporting surface and of a width equal to the width of said surface, said elements controlling transmission of tickets to the respective receptacles, means arranged longitudinally of the machine and said supporting surface above said switch elements for conveying tickets from the pick-up and delivery means to the respective switch elements for transmission to the receptacles controlled thereby, a series of manually actuated keys arranged at one side of the machine adjacent the pick-up and delivery means, means including rods extending from each switch element to the first named side of the machine and in operative engagement with predetermined keys whereby the depression of one of the keys will cause one of said switch elements to be moved into operative position, a control bar arranged longitudinally of the machine and in operative engagement with all of said rods for supporting the respective switch elements in raised position when the respective keys are released, said control bar being in operative engagement with the respective keys to return a raised switch element to normal position in the operation of raising another switch element, means comprising a clutch mechanism for actuating the ticket pick-up and delivery means in the operation of each of said keys, a plurality of independently driven conveyor units for transmitting tickets from the switch elements to their respective receptacles, means for guiding the tickets from the switch elements to the conveyor units, means including a movable backing wall for stacking the tickets in each receptacle, and means for automatically signalling the operator when each receptacle is filled with stacked tickets.

13. A machine of the class described comprising a top plate, a ticket supporting surface extending longitudinally of said plate from the front to the rear end portions thereof, means including a compartment at the forward end of said plate in alinement with said surface for movably supporting a stack of tickets, a plurality of switch elements spaced longitudinally of and forming part of said supporting surface, said surface and switch elements being grooved centrally thereof, an endless belt mounted to move longitudinally of the supporting surface with the lower portion of the belt operating in juxtaposition to the central groove of said surface, means arranged above a stack of tickets supported in the machine for picking up and delivering the uppermost ticket of the stack to said supporting surface and said belt conveyor, and said belt conveyor in conjunction with the groove of said surface being adapted to frictionally feed the ticket to a predetermined switch element of said supporting surface.

14. A machine of the class described comprising a top plate, a ticket supporting surface extending longitudinally of said plate from the front to the rear end portions thereof, means including a compartment at the forward end of said plate in alinement with said surface for movably supporting a stack of tickets, a plurality of switch elements spaced longitudinally of and forming part of said supporting surface, said surface and switch elements being grooved centrally thereof, an endless belt mounted to move longitudinally of the supporting surface with the lower portion of the belt operating in juxtaposition to the central groove of said surface, means arranged above a stack of tickets supported in the machine for picking up and delivering the uppermost ticket of the stack to said supporting surface and said belt conveyor, said belt conveyor in conjunction with the groove of said surface being adapted to frictionally feed the ticket to a predetermined switch element of said supporting surface, a plurality of lugs for supporting the top plate of the machine above a floor or other support, a plurality of ticket receiving receptacles arranged beneath the top plate in vertically and longitudinally spaced relation to each other, a receptacle being provided for each switch element, and means comprising independently driven belt conveyor units for transmitting tickets from said switch elements to the respective receptacles.

15. A machine of the class described comprising a top plate, a ticket supporting surface extending longitudinally of said plate from the front to the rear end portions thereof, means including a compartment at the forward end of said plate in alinement with said surface for movably supporting a stack of tickets, a plurality of switch elements spaced longitudinally of and forming part of said supporting surface, said surface and switch elements being grooved centrally thereof, an endless belt mounted to move longitudinally of the supporting surface with the lower portion of the belt operating in juxtaposition to the central groove of said surface, means arranged above a stack of tickets supported in the machine for picking up and delivering the uppermost ticket of the stack to said supporting surface and said belt conveyor, said belt conveyor in conjunction with the groove of said surface being adapted to frictionally feed the ticket to a predetermined switch element of said supporting surface, a plurality of lugs for supporting the top plate of the machine above a floor or other support, a plurality of ticket receiving receptacles arranged beneath the top plate in vertically and longitudinally spaced relation to each other, a receptacle being provided for each switch element and means comprising independently driven belt conveyor units for transmitting tickets from said switch element to the respective receptacles, means for constantly operating the first and second named conveyors, a plurality of manually actuated keys at one side of the top plate controlling the operation of the separate switch elements, and means comprising a clutch mechanism actuated in the operation of any of said keys for causing the ticket pick-up and delivery means to be actuated.

16. A machine of the class described comprising a top plate, a ticket supporting surface extending longitudinally of said plate from the front to the rear end portions thereof, means including a compartment at the forward end of said plate in alinement with said surface for movably supporting a stack of tickets, a plurality of switch elements spaced longitudinally of and forming part of said supporting surface, said surface and switch elements being grooved centrally thereof, an endless belt mounted to move longitudinally of the supporting surface with the lower portion of the belt operating in juxtaposition to the central groove of said surface, means arranged above a stack of tickets supported in the machine for picking up and delivering the uppermost ticket of the stack to said supporting surface and said belt conveyor, said belt conveyor in conjunction with the groove of said surface being adapted to frictionally feed the ticket to a predetermined switch element of said supporting surface, a plurality of lugs for supporting the top plate of the machine above the floor or other support, a plurality of ticket receiving receptacles arranged beneath the top plate in vertically and longitudinally spaced relation to each other, a receptacle being provided for each switch element and means comprising independently driven belt conveyor units for transmitting tickets from said switch elements to the respective receptacles, means for constantly operating the first and second named conveyors, a plurality of manually actuated keys at one side of the top plate controlling the operation of the separate switch elements, means comprising a clutch mechanism actuated in the operation of any of said keys for causing the ticket pick-up and delivery means to be actuated, and means including an adjustable gage device interposed between the pick-up and delivery means and said first named belt conveyor to provide the delivery of single tickets to said conveyor.

17. A machine of the class described comprising a top plate, a ticket supporting surface extending longitudinally of said plate from the front to the rear end portions thereof, means including a compartment at the forward end of said plate in alinement with said surface for movably supporting a stack of tickets, a plurality of switch elements spaced longitudinally of and forming part of said supporting surface, said surface and switch elements being grooved centrally thereof, an endless belt mounted to move longitudinally of the supporting surface with the lower portion of the belt operating in juxtaposition to the central groove of said surface, means arranged above a stack of tickets supported in the machine for picking up and delivering the uppermost ticket of the stack to said supporting surface and said belt conveyor, said belt conveyor in conjunction with the groove of said surface being adapted to frictionally feed the ticket to a predetermined switch element of said supporting surface, a plurality of lugs for supporting the top plate of the machine above a floor or other support, a plurality of ticket receiving receptacles arranged beneath the top plate in vertically and longitudinally spaced relation to each other, a receptacle being provided for each switch element and means comprising independently driven belt conveyor units for transmitting tickets from said switch elements to the respective receptacles, means for constantly operating the first and second named conveyors, a plurality of manually actuated keys at one side of the top plate controlling the operation of the separate switch elements, means comprising a clutch mechanism actuated in the operation of any of said keys for causing the ticket pick-up and delivery means to be actuated, means including an adjustable gage device interposed between the pick-up and delivery means and said first named belt conveyor to provide the delivery of single tickets to said conveyor, and a control bar in operative engagement with all of said keys and said switch elements for permitting one switch element only to assume an operative position in the successive operation of different keys.

18. In a ticket sorting machine of the class described, a plurality of switch elements controlling delivery of tickets to independent receptacles, a key actuated mechanism controlling the operation of said switch elements, each element including a rod, a dog at one end of the rod, a control bar adjacent the dog and engaged thereby to support the switch element in operative position and a member on the rod intermediate the switch element and dog in operative engagement with the manually actuated key for moving the switch element into operative position and for returning the same to normal position when said dog is released by said bar.

19. In a ticket sorting machine of the class described, a plurality of switch elements controlling delivery of tickets to independent receptacles, a key actuated mechanism controlling the operation of said switch elements, each element including a rod, a dog at one end of the rod, a control bar adjacent the dog and engaged thereby to support the switch element in operative position, a member on the rod intermediate the switch element and dog in operative engagement with the manually actuated key for moving the switch element into operative position and for returning the same to normal position when said dog is released by said bar, and all of said manually actuated keys being in operative engagement with said bar whereby in the operation of raising one switch element, a previously raised switch element will be returned to its lower or inoperative position.

20. In a ticket sorting machine of the class described, a plurality of switch elements controlling delivery of tickets to independent receptacles, a key actuated mechanism controlling the operation of said switch elements, each element including a rod, a dog at one end of the rod, a control bar adjacent the dog and engaged thereby to support the switch element in operative position, a member on the rod intermediate the switch element and dog in operative engagement with the manually actuated key for moving the switch element into operative position and for returning the same to normal position when said dog is released by said bar, all of said manually actuated keys being in operative engagement with said bar whereby in the operation of raising one switch element, a previously raised switch element will be returned to its lower or inoperative position, means for feeding tickets longitudinally of the spaced switch elements and tickets pick-up and delivery means for delivering tickets to said last named feeding means, and a clutch device actuated in the operation of any of said keys for operating the ticket pick-up and delivery means.

21. In a ticket sorting machine, the combination with an intermittently actuated ticket delivery means, of means for conveying tickets to a plurality of ticket receiving receptacles in the process of sorting said tickets, said conveyor means comprising an elongated surface, an endless round belt conveyor arranged over and with one part of said belt travelling longitudinally of and in a groove formed in said surface, a plurality of switch elements forming part of and transversing said surface, said switch elements being adapted to be raised on the surface to deflect tickets therefrom into receptacles controlled thereby, and said switch elements being notched to receive said belt conveyor when in raised position.

22. In a ticket sorting machine, the combination with an intermittently actuated ticket delivery means, of means for conveying tickets to a plurality of ticket receiving receptacles in the process of sorting said tickets, said conveyor means comprising an elongated surface, an endless round belt conveyor arranged over and with one part of said belt travelling longitudinally of and in a groove formed in said surface, a plurality of switch elements forming part of and transversing said surface, said switch elements being adapted to be raised on the surface to deflect tickets therefrom into receptacles controlled thereby, said switch elements being notched to receive said belt conveyor when in raised position, and independently actuated belt conveyor units adjacent the respective switch elements for delivering the tickets from said elements to the receptacles controlled thereby.

23. In a ticket sorting machine, the combination with an intermittently actuated ticket delivery means, of means for conveying tickets to a plurality of ticket receiving receptacles in the process of sorting said tickets, said conveyor means comprising an elongated surface, an endless round belt conveyor arranged over and with one part of said belt travelling longitudinally of and in a groove formed in said surface, a plurality of switch elements forming part of and transversing said surface, said switch elements being adapted to be raised on the surface to deflect tickets therefrom into receptacles controlled thereby, said switch elements being notched to receive said belt conveyor when in raised position, independently actuated belt conveyor units adjacent the respective switch elements for delivering the tickets from said elements to the receptacles controlled thereby, the switch elements being arranged in two groups spaced longitudinally of said surface, and said receptacles being arranged in step-like groups beneath said surface.

24. In a ticket sorting machine, the combination with an intermittently actuated ticket delivery means, of means for conveying tickets to a plurality of ticket receiving receptacles in the process of sorting said tickets, said conveyor means comprising an elongated surface, an endless round belt conveyor arranged over and with one part of said belt travelling longitudinally of and in a groove formed in said surface, a plurality of switch elements forming part of and transversing said surface, said switch elements being adapted to be raised on the surface to deflect tickets therefrom into receptacles controlled thereby, said switch elements being notched to receive said belt conveyor when in raised position, independently actuated belt conveyor units adjacent the respective switch elements for delivering the tickets from said elements to the receptacles controlled thereby, and adjustable means in advance of said conveyor belt for controlling the delivery of single tickets thereto.

25. A sorting machine including a plurality of horizontal aligned manually operable switches over which a ticket is conveyed, a container at one end thereof to receive a stack of tickets with the topmost ticket in substantial alinement with the switches, a buckle type feeder at the top of said container adapted to periodically feed the topmost ticket to the switches, and a swinging gate forming a wall of said container normally closed to prevent reverse movement of the ticket during feeding.

26. A sorting machine including a plurality of horizontal aligned manually operable switches over which a ticket is conveyed, a container at one end thereof to receive a stack of tickets with the topmost ticket in substantial alignment with the switches, a buckle type feeder at the top of said container adapted to periodically feed the topmost ticket to the switches, a swinging gate forming a wall of said container normally closed to prevent reverse movement of the ticket during feeding, and means to adjust the gate to adapt the container to stacks of tickets of different sizes.

27. A sorting machine including manually operable switches and guiding runways over which tickets pass for distribution, belt conveyors for said elements each having a reach coinciding with the carrying plane of the elements, and said elements being grooved adjacent each belt reach to prevent contact with the conveyor belt and insure a positive depressing engagement of a ticket by said belt.

28. A sorting machine including manually operable switches and guiding runways over which tickets pass for distribution, belt conveyors above said elements coinciding with the carrying plane thereof engageable with an interposed ticket, and means on said elements whereby the belt engaged portions of the tickets may be depressed below the top plane thereof.

29. A ticket sorting machine including means for directing the course of tickets over a series of elements for distribution, belt conveyors above said elements coinciding with the carrying plane thereof engageable with an interposed ticket, and means on said elements whereby the belt engaged portions of the tickets may be depressed below the top plane thereof.

30. A sorting machine including a plurality of horizontally arranged switch elements over which a ticket is conveyed by means that slightly depress the ticket at an intermediate contact, means for slightly tilting the switches upwardly to deflect a ticket, and the front edges of said switches, being inclined rearwardly from points of initial contact with said ticket to readily deflect any engaged portion of a ticket that is out of a horizontal plane.

31. A switch element for ticket sorting machines having a flat body portion with an intermediate front notch and front edges tapering rearwardly therefrom.

32. A sorting machine including a plurality of horizontally arranged switch elements over which a ticket is conveyed by a round conveyor belt that slightly depress the ticket at an intermediate contact, means for slightly tilting the switches upwardly to deflect a ticket, the front edge of each switch being centrally notched to straddle the conveyor belt upon tilting movement and also inclined rearwardly from the notch to readily deflect any engaged portion of a ticket that is out of a horizontal plane.

33. In a machine of the class described having a conveyor belt to carry tickets to switch elements, said switch elements being triangular in plan and having a cut-out portion extending crosswise of said switch element from the apex of the triangle to said base, said cut-out portion being adapted to receive said conveyor belt.

34. In a machine of the class described having a conveyor belt to carry tickets to switch elements, said switch elements being wedge-shaped in cross section, triangular in plan and having a cut-out portion extending crosswise of said switch element from the apex of the triangle, to said base, said cut-out portion being adapted to receive said conveyor belt.

35. A machine of the class described for sorting tickets having data on one face including a plurality of aligned switches over which a ticket is conveyed, means to cause a switch to deflect a ticket, a deflected ticket runway for each switch angularly arranged with respect thereto, a ticket receptacle at an angle thereto and adjacent the lower end of a ticket runway, and continously operated angularly related conveyors to carry said tickets into said receptacles and stack them on edge therein, with its data facing the stack.

36. A sorting machine including a horizontal support, a plurality of aligned switch elements mounted thereon over which tickets having data on one face are conveyed horizontally, means for tilting said switches to deflect a ticket downwardly, runways beneath each switch at angles thereto to guide deflected tickets in a vertical plane, a receptacle for each runway, and means including angularly related power driven conveyors to direct and stack the tickets in following relationship with the data side facing the stack in the receptacles in the same plane of their movement through the runways.

37. In a machine of the class described having a compartment for tickets, a pick up and delivery mechanism, a conveyor to receive the tickets from the delivery mechanism, a plurality of switch elements, a plurality of runways for each switch element, ticket receiving receptacles adjacent the lower edge of said runway but offset therefrom, manually operable means to cause the switch elements to deflect said tickets in certain predetermined runways, power driven conveyors each having an operative reach in a ticket receptacle to carry the tickets from the runways into the offset ticket receiving receptacles, and means to stack said tickets vertically on edge in said receptacles.

38. In a machine of the class described having a compartment for tickets, a pick up and delivery mechanism, a conveyor to receive the tickets from the delivery mechanism, a plurality of switch elements, a plurality of runways for each switch elements, said switches and runways being arranged in groups spaced from each other, ticket receiving receptacles adjacent the lower end of said runway but offset therefrom, manually operable means to cause the switch elements to deflect said tickets in certain predetermined runways, power driven conveyors each having a reach in a ticket receptacle to carry the tickets from the runways into the offset ticket receiving receptacles, and means to stack said tickets vertically on edge in said receptacles.

39. In a machine of the class described comprising a conveyor to which tickets are delivered, a plurality of manually operable switch elements, a plurality of runways one for each switch element, a plurality of ticket receiving receptacles adjacent the lower end of each of said runways and offset therefrom, means to convey said tickets through said runways and to a point adjacent the ticket receiving receptacles, power driven conveyors to convey said tickets from said runways into said ticket receiving receptacles, and power driven conveyors each having a reach in a receptacle to stack said tickets vertically in said ticket receiving receptacles.

40. A sorting machine including a horizontal support, a plurality of aligned switch elements mounted thereon over which tickets are conveyed horizontally, means for tilting said switches to deflect a ticket downwardly, runways beneath each switch at right angles thereto to guide deflected tickets in a vertical plane, conveyors for the tickets in said runways, a terminal receptacle for each runway at right angles thereto, stacking conveyors in each receptacle offset with respect to the runway conveyors but parallel therewith, and offset conveyors connecting the runway and stacking conveyors.

41. A ticket handling machine comprising a plurality of manually operable switch elements arranged in groups, a plurality of runways, one for each switch element, a plurality of ticket receiving receptacles each one adjacent the lower end of one of said runways but offset therefrom, and power driven conveyor means including a reach in each ticket receiving receptacle to convey tickets from said switch elements and stack them vertically in said ticket receiving receptacles.

42. A ticket sorting machine including a supporting platform, groups of closely spaced switches mounted therein spaced by bridging portions of the platform, means for conveying tickets over the platform and groups of switches, means for actuating the switches to deflect tickets beneath the platform, right-angled depending runways arranged one beneath each switch, the runways of each group of switches being of successively graduated length, and terminal receptacles for each runway at right angles thereto arranged in overlapping relationship with the other receptacles of each group, the farthest projecting receptacle of each group terminating closely adjacent the first runway of the next group and beneath a bridging portion of the platform and power driven conveyors having a reach in each ticket receiving receptacle.

43. In a machine of the class described having a conveyor belt to carry tickets to switch elements, said switch elements being wedge-shaped in cross section, triangular in plan and having a cut-out portion extending crosswise of said switch element from the apex of the triangle to said base, said cut-out portion being adapted to receive said conveyor belt, each switch element being fixedly secured to a rod which extends laterally therefrom, a dog on said rod to lock said switch element in open position, and means on said rod to actuate said dog and to serve as a weight to effect immediate closing of the switch element when it is released from open position.

44. A sorting machine including a plurality of switch elements to deflect tickets or the like, each switch element having a body portion over which a ticket is adapted to pass or be deflected thereby, an operating rod extending laterally therefrom, a weighted actuating member on said rod movable in one direction to lift the switch and releasable to return the switch to closed position by gravity, and a locking dog on said rod to hold the switch in lifted position.

45. A ticket sorting machine including a plurality of horizontal aligned manually operable switches over which tickets are conveyed, a lock bar arranged longitudinally of the machine at one side thereof and substantially in the plane of the switches, and cooperating means on said bar and each of said switches whereby a previously actuated switch is held locked until the successive actuation of another key.

LEON E. BARNES.